UNITED STATES PATENT OFFICE.

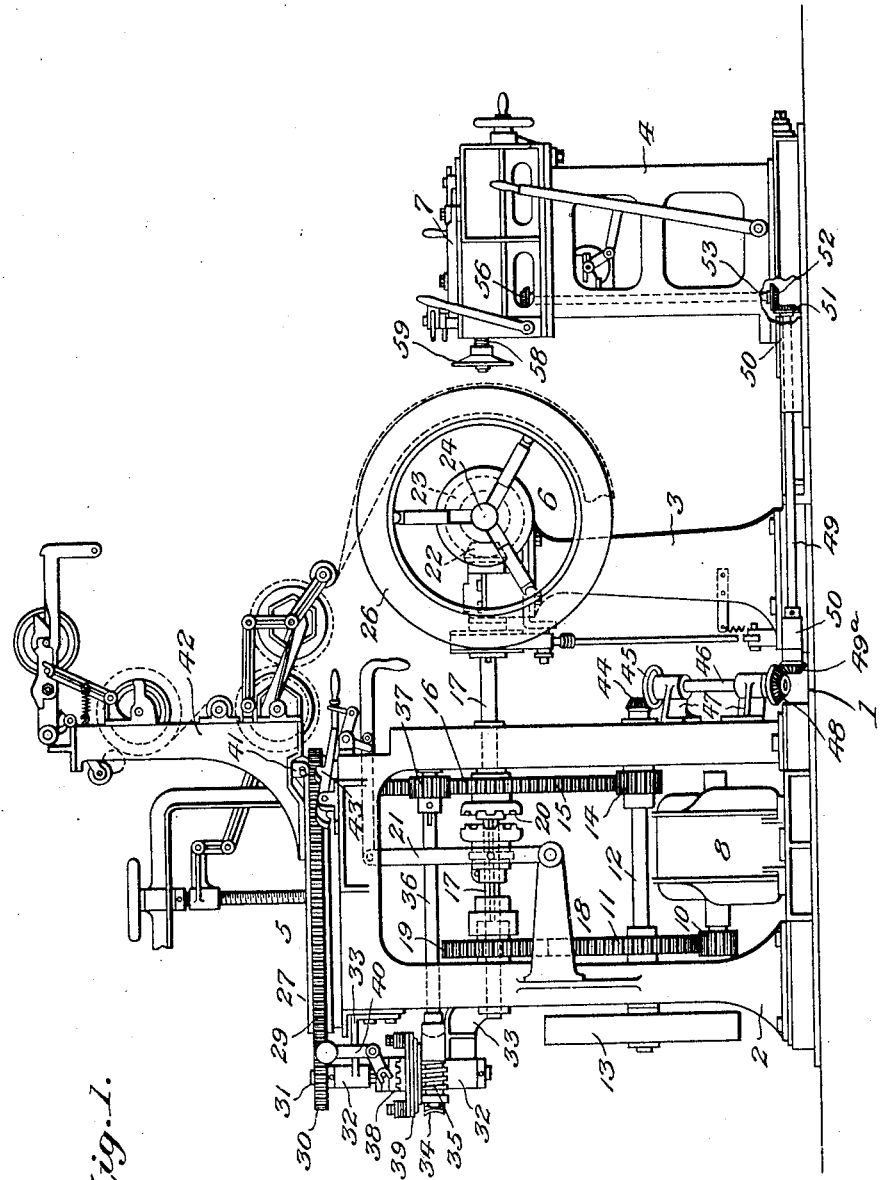

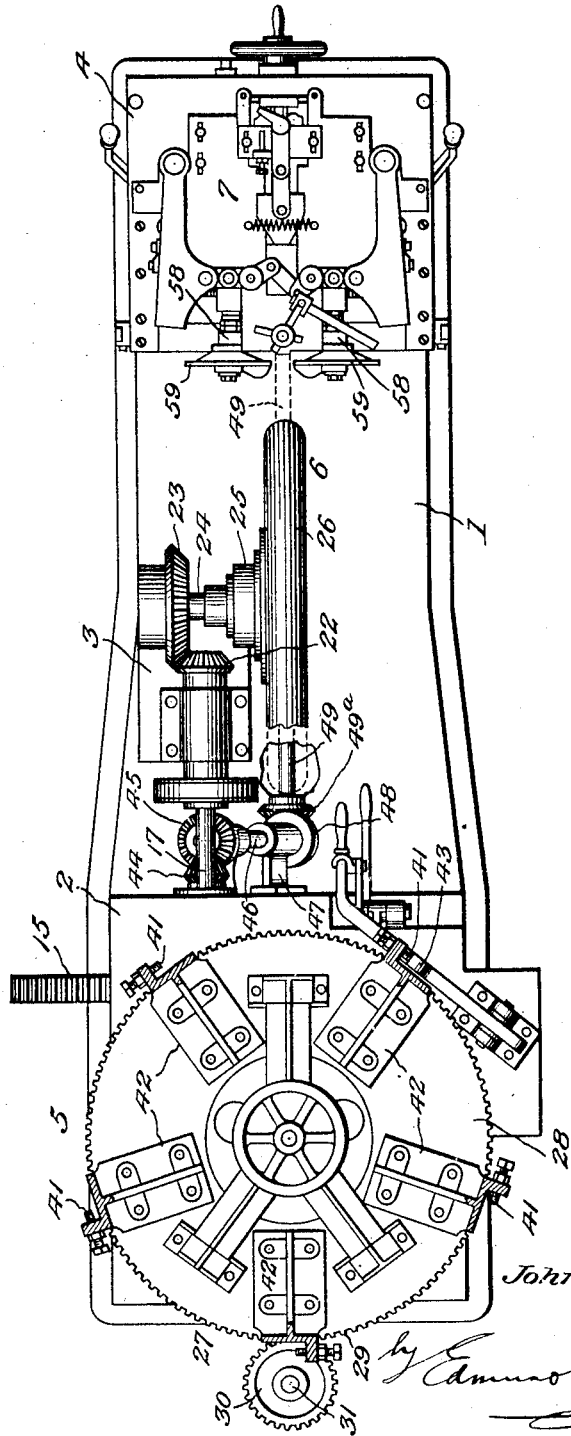

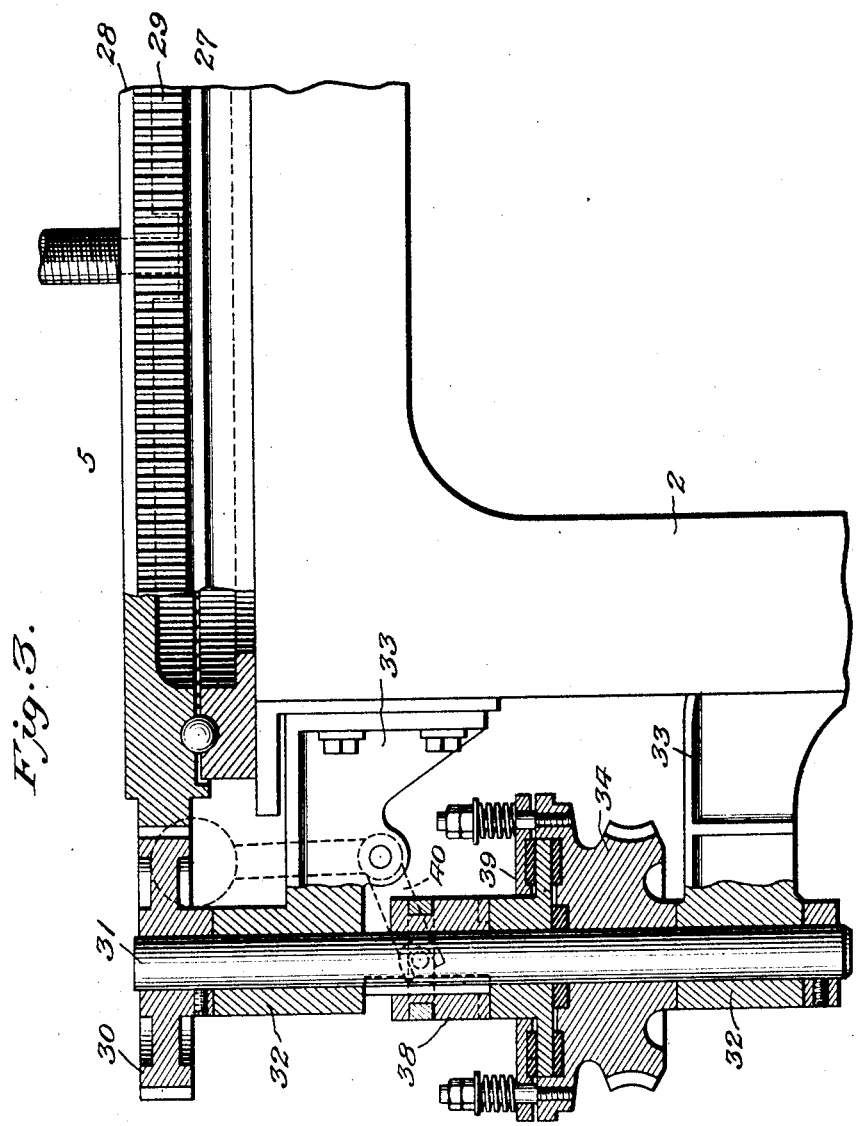

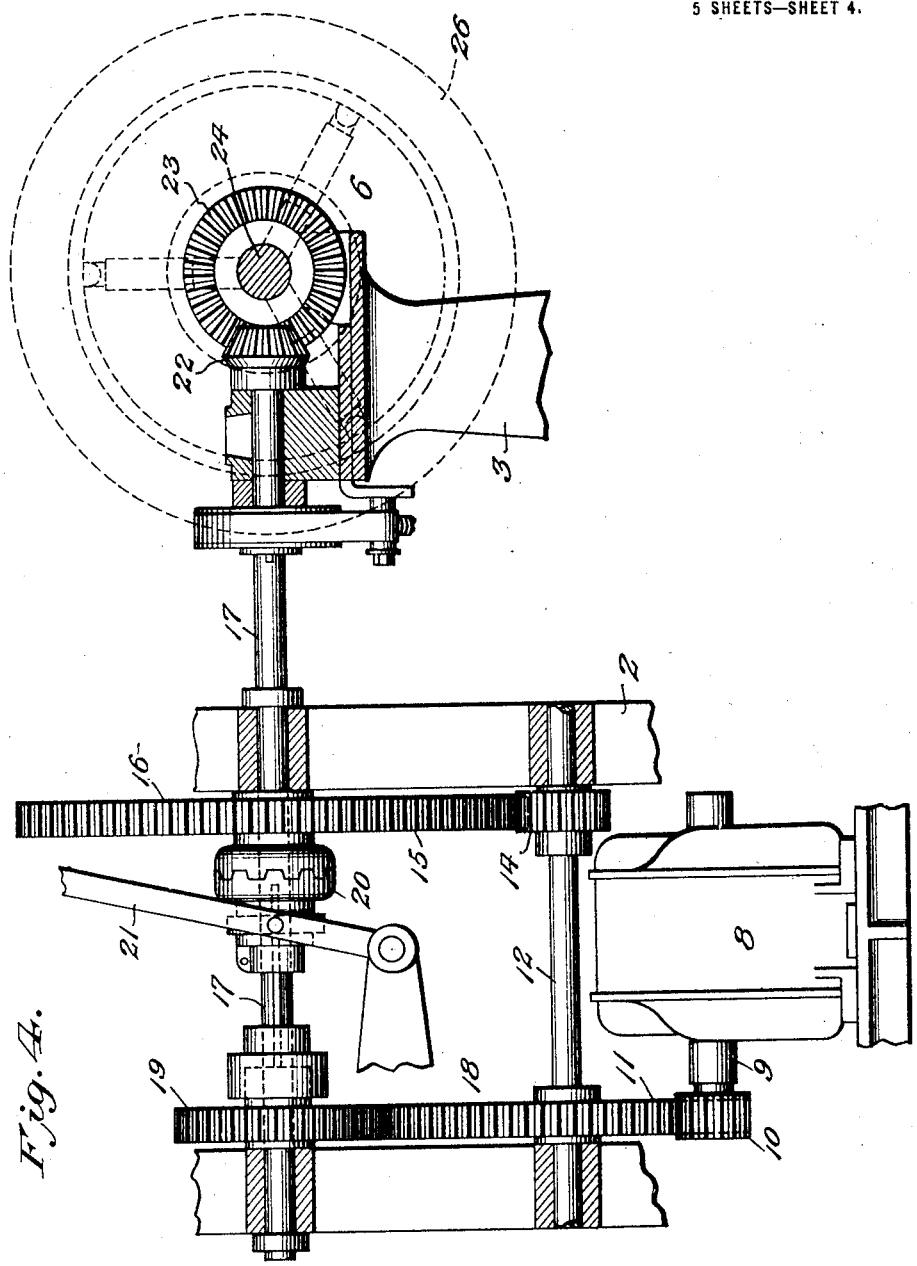

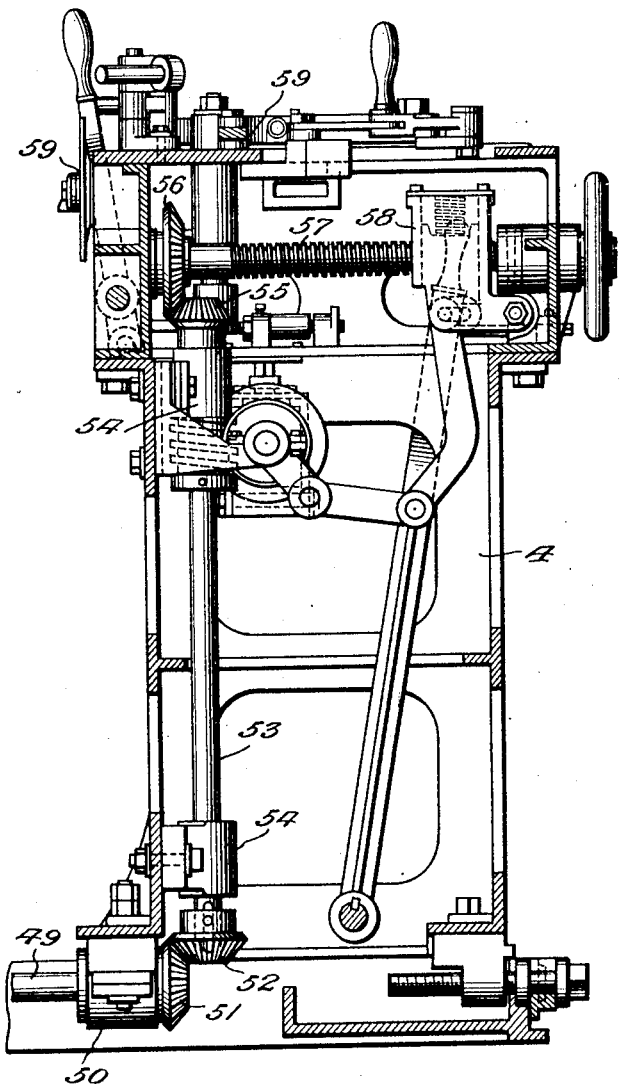

JOHN J. CONVERY, OF NEW YORK, N. Y., ASSIGNOR TO KELLY-SPRINGFIELD TIRE COMPANY, OF AKRON, OHIO, A CORPORATION OF NEW JERSEY.

TIRE-BUILDING MACHINE.

1,332,608.     Specification of Letters Patent.     Patented Mar. 2, 1920.

Original application filed June 13, 1918, Serial No. 239,826. Divided and this application filed September 3, 1918. Serial No. 252,424.

*To all whom it may concern:*

Be it known that I, JOHN J. CONVERY, a citizen of the United States, residing at New York, in the county of New York and State of New York, have invented certain new and useful Improvements in Tire-Building Machines, of which the following is a specification, reference being had therein to the accompanying drawing.

This invention relates to tire-building machines and has particular reference to certain structures so aggrouped and coöperatively related therein as to receive actuation from a common driving mechanism.

In tire-building machines, as rather generally operated in tire-making plants at the present time, there is usually included a fabric-supplying structure, a revoluble core juxtaposed thereto and adapted to receive tire-fabric therefrom, and a carcass-stitching structure adapted to operate on the tire-fabric after it has been disposed on the core from the supplying-structure. One form of tire-supplying structure that is thus employed comprises a rotatable turret or support upon which is sustained a series of tire-holding rolls and coöperating fabric-stretching devices, each of the series being positionable successively in co-acting relation to the core. In an apparatus revealed in an application of mine for United States Letters-Patent, filed June 13, 1918, Serial No. 239,826, there is shown a power-actuated fabric-supplying structure of a type which, in practice, I have found to be advantageous for the purpose; and in connection therewith are disclosed a revoluble core and coöperating stitching mechanism with a driving mechanism common to these three structures. The present case is a true and legal division of that particular application and is directed to the combination of those structures and the common driving mechanism therefor.

The primary object of the invention is to present the necessary components of the machine in such form that the latter is practically a "one-man" structure of simple and compact construction and arrangement and readily operated and controlled.

Other objects and advantages are also characteristics of the invention, all as will be made apparent from the following description.

In order that the invention may be more readily comprehended, I have shown in the accompanying drawings a preferred and practical embodiment and utilization of the same, though it is to be understood that these drawings are merely illustrative and that the invention is susceptible of considerable variation and modification without departing from the salient principles and features thereof.

In these drawings:

Figure 1 is a view in elevation of a tire-building machine embodying my present invention;

Fig. 2 is a fragmentary view in top plan of the same;

Fig. 3 is a fragmentary view, on a somewhat larger scale and in vertical section, of the power-driven turret constituting one component of the machine;

Fig. 4 is a similar view of the revoluble power driven core constituting another component thereof; and Fig. 5 is a similar view of the stitching-carriage structure constituting still another component thereof.

Referring to these drawings, the reference-character 1 designates, generally, a base for the apparatus in its entirety.

*Primary driving mechanism.*—Upstanding from this base are three upright supporting structures or pedestals 2, 3 and 4, respectively, for the turret-component 5, the core-component 6, and stitcher-carriage component 7 of the machine. Since the details of these supporting-structures are (for the present case) relatively unimportant—they being more completely disclosed and claimed in my aforementioned pending application, Serial No. 239,826, and, also, in my co-pending applications, Serial Nos. 239,827 and 243,585, it is deemed unnecessary to describe them here at length: Suffice it to say that the three aforementioned turret, core and stitcher-carriage components are to be actuated by means of a prime-mover or motor 8 through their respective driving connections, as will hereinafter be described.

An armature-shaft 9 of the motor carries a pinion 10 with which meshes a gear 11 fast on a horizontal primary drive-shaft 12, which, through the pinion 10 and gear 11, receives motion from the motor 8. In lieu of driving the shaft 12 by this motor, it may be operated by a belt (not shown) or the like for turning a prime-mover or pulley 13, the belt, etc., receiving movement from any suitable source of power.

*Core-drive.*—On the shaft 12 is a pinion 14 with which meshes a low-speed gear 15 for driving a gear 16 on a horizontal shaft 17. Meshing with the gear 11 is a high-speed gear 18 which is adapted for driving a gear 19 on the shaft 17; these low and high speed gears being alternately operative on the shaft by means of a clutch designated, generally, by 20, this clutch being controlled by a shifter 21.

The shaft 17 carries a beveled gear 22 which drives a corresponding gear 23 on a chuck-shaft 24, the latter being operatively connected to a core-chuck 25 on which a core 26 is sustained; this chuck and core constituting what I have hereinbefore designated the "core-component" 6.

*Turret-drive.*—Mounted on the pedestal or upright 2, for rotative movement thereon, is a roll-sustaining turret 27 which, preferably and as here shown, comprises an annular member or table 28 having its periphery provided with gear-teeth 29. The turret is adapted to be driven, for its rotative movement, by turret-actuating mechanism that is in driving connection with the prime-mover, which is also common to the other aforementioned components of the machine, as already stated. This actuating-mechanism, in this instance, preferably includes a pinion 30 which is keyed to a vertical shaft 31 journaled in bearings 32 that are formed in brackets 33 outstanding from the pedestal 2. Loosely mounted on the shaft is a worm-wheel 34 which is adapted to mesh with a worm 35 that is fast on a horizontal shaft 36. This latter shaft carries a gear 37 which is adapted to mesh with and receive motion from the low-speed gear 15.

It will now be understood that the low-speed gearing (including this gear 15) is in constant and direct connection with the prime-mover, and that this constitutes the primary drive both for the core-component and for the turret-component. Moreover, since the worm-wheel 34 is in direct driving connection with the low-speed gearing, as aforementioned, it, likewise, is constantly rotating. The worm-wheel 34 is connectible to the shaft 31 by means of jaw and friction clutch-devices 38 and 39, respectively, the latter being of such construction as to permit slippage at times—all as fully explained in my aforementioned application, Serial No. 239,826—while the former may be controlled by a clutch-shifter 40. This shifter is generally utilized only when it is desired to permit free rotation of the turret, as (for instance) when it might be desired to reverse the rotative movement thereof. It will be understood that, normally, the turret is in driving connection with the worm-wheel and, thus, with the prime-mover.

In this type of construction, it may be desirable at times to arrest the rotation of the turret at predetermined positions; and, in the present instance, such means include a series of stops 41, one juxtaposed to each roll-supporting standard 42 and engageable with a relatively fixed stop 43—all for the purpose and operating in the manner fully disclosed in my aforementioned application, Serial No. 239,826. It is to be understood, in view of the fact that the turret is constantly in direct driving connection with the low-speed gear, that when any of the stops or arresting devices 41 engages the stop 43, these and the turret will be positively arrested in their rotative movement.

*Stitcher-carriage drive.*—The fact has already been alluded to that the primary drive for the core and turret components is also common to the stitcher-carriage component: To this end it involves the following structure: The primary shaft 12 carries, at one extremity, a beveled pinion 44 adapted to mesh with a corresponding pinion 45 fast on the upper end of a vertical shaft 46 journaled in brackets 47 outstanding from the pedestal 2. At its lower end, the shaft 46 carries a beveled pinion 48 adapted to mesh with a corresponding pinion 49ª which is fast on a horizontal shaft 49 supported in bearing-brackets 50. The shaft 49 carries a beveled pinion 51 which meshes with a corresponding pinion 52 fast on the lower end of a vertical shaft 53 supported in bearings 54 in the stitcher-carriage pedestal 4. The upper end of this shaft is provided with a beveled pinion 55 which meshes with a corresponding pinion 56 on a carriage-feed-screw 57 suitably journaled in the pedestal 4 in a horizontal plane. Engageable with this screw is a carriage-connecting device 58 that is carried by and movable with a stitcher-carriage 59. This device 58 affords means for connecting the carriage to the screw, all as set forth in my aforementioned pending application, Serial No. 243,585, filed July 6, 1918.

It will now be seen that through the shafts 46, 49 and 53 and the pinions carried thereby, the carriage feed-screw 57 is in direct driving connection with the primary drive-shaft 12, and, thus, with the prime-mover. Hence, it is now manifest how the turret, core and stitcher-carriage derive motion from a single prime-mover. While the turret-turning is being effected by the driving mechanism, the core may or may not be rotated, this being governed by the convenience of the operator. After the fabric has been stretched on the core, cut to proper length and spliced thereon, the operator throws the core into high-speed rotation, and also starts the stitcher-carriage. He may then set the turret-arresting devices and permit the turret to be rotated so as to bring the next supply of fabric into position. Thus, the core will be rotated at high speed, the stitcher-carriage will be operating, and the turning of the turret will be accomplished, all simultaneously, or in succession. On the other hand, the turret will be held stationary while the fabric is being supplied therefrom onto the core, during the fabric-stretching operation, for example. When this latter operation is being accomplished, the stitcher-carriage will be at rest. Usually, while the core is rotating at high speed, the stitcher-carriage is being operated by the driving mechanism.

On the carriage are supported a pair of normally spaced-apart stitcher-supporting arms 58, each of which is provided with a stitcher-device 59. By reason of the fact that these devices are mounted on the carriage, it will be seen that the traveling movement of the carriage effects a positioning of these devices in respect to the core and also causes them to traverse and stitch down fabric onto the sides of the core, whereby a tire-carcass may be constructed. Therefore, the operation of the driving mechanism aforementioned accomplishes an actuation of the fabric-stitching mechanism comprising the carriage and the stitcher-devices which it sustains.

From the foregoing, it will be perceived that I have provided an exceedingly convenient arrangement of carcass-constructing instrumentalities and, also, that they derive motion from a single prime-mover, thereby permitting a nicety and certainty of action, with desirable synchronism and coaction, such that a superior product is made possible at all times and with a minimum of labor and human action and control.

What I claim is:

1. In combination, a tire-building core, a support juxtaposed thereto, a fabric-supplying structure disposed on the support and rotatable on an approximately vertical axis, a fabric-stitching mechanism juxtaposed to the core opposite the fabric-supplying structure, and driving mechanism common to the structure, to the core, and to the stitching mechanism for effecting rotation of the core, action of the stitcher mechanism, and a rotatable movement of the structure on its axis successively to the action of the core and stitcher mechanism.

2. In combination, a tire-building core, a support juxtaposed thereto, a fabric-supplying structure rotatable on a vertical axis on the support, a fabric-stitching mechanism juxtaposed to the core opposite the fabric-supplying structure, and driving mechanism common to the structure, to the core, and to the stitching mechanism for effecting movement thereof, the core and stitching mechanism receiving motion therefrom simultaneously while the fabric-supplying structure remains at rest, and the structure receiving motion from the driving mechanism for a rotatable movement on its vertical axis in predetermined relation to the action of the core and stitching mechanism.

3. In combination, a tire-building core, a support juxtaposed thereto, a fabric-supplying structure rotatably disposed on the support, a fabric-stitching mechanism juxtaposed to the core opposite the fabric-supplying structure, driving mechanism common to the structure, to the core, and to the stitching mechanism for effecting movement thereof, the core and stitching mechanism receiving motion therefrom simultaneously while the fabric-supplying structure remains at rest, means for rendering the driving mechanism active on the fabric-supplying structure while the core and stitching mechanism are at rest and a slippage device associated with the driving mechanism for controlling movement of said structure.

4. In combination, a tire-building core, a support juxtaposed thereto, a fabric supplying structure rotatably disposed on the support, a fabric-stitching mechanism juxtaposed to the core opposite the fabric-supplying structure, driving mechanism common to the structure, to the core, and to the stitching mechanism for effecting movement thereof, means for arresting movement of the fabric-supplying structure periodically and for maintaining it at rest while the core and stitching mechanism are active and a slippage device associated with the driving mechanism for controlling movement of said structure.

5. In combination, a tire-building core, a support juxtaposed thereto, a fabric-supplying structure rotatably disposed on the support, a fabric-stitching mechanism juxtaposed to the core opposite the fabric-supplying structure, driving mechanism common to the structure, to the core, and to the stitching mechanism for effecting movement thereof, and means for arresting movement of the fabric-supplying structure periodically and for maintaining it at rest while the core and stitching mechanism are active, said driving mechanism including clutch mechanism operable to permit a predetermined slippage of the supplying structure and, thereby, insuring constant operation of said rest-maintaining means while the core is in motion.

6. In combination, a support, a fabric-supplying structure to rotate on a vertical axis on the support, a fabric-stitching mechanism juxtaposed opposite the fabric-supplying structure, driving mechanism common to the structure and to the stitching mechanism for effecting rotative movement thereof on its vertical axis, the stitching mechanism receiving motion therefrom simultaneously while the fabric-supplying structure remains at rest, and means for rendering the driving mechanism constantly active on the fabric-supplying structure while the stitching mechanism is at rest but having a normal tendency to retard movement of the structure.

7. In combination, a support, a fabric-supplying structure rotatably disposed on the support, a fabric-stitching mechanism juxtaposed opposite the fabric-supplying structure, driving mechanism common to the structure and to the stitching mechanism for effecting movement thereof, means for arresting movement of the fabric-supplying structure periodically and for maintaining it at rest while the stitching mechanism is active and means influenced by the driving mechanism for giving to the structure a normal tendency to operate after its movement is arrested.

8. In combination, a support, a fabric-supplying structure rotatably disposed on the support, a fabric-stitching mechanism juxtaposed opposite the fabric-supplying structure, driving mechanism common to the structure and to the stitching mechanism for effecting movement thereof, and means for arresting movement of the fabric-supplying structure periodically and for maintaining it at rest while the stitching mechanism is active, said driving mechanism including clutch mechanism operable to permit a predetermined slippage of the supplying structure and, thereby, insuring constant operation of said rest-maintaining means.

9. A tire-building machine, including a rotatable turret-component, a core-component juxtaposed thereto and rotatable in a vertical plane in relation thereto, a stitcher-carriage component positionable in relation to the core, a prime-mover, and driving connections therebetween and the three components whereby they may be actuated simultaneously or successively, the turret-component being rotatable on an approximately vertical axis and at a speed relatively different from the speed of rotation of the core.

10. A tire-building machine, including a rotatable turret-component, a core-component juxtaposed thereto and rotatable in a vertical plane in relation thereto, a stitcher-carriage component positionable in relation to the core, a prime-mover, and driving connections therebetween and the three components whereby they may be actuated simultaneously or successively, including low and high speed gearing for the core-component, the turret-component being rotatable on an approximately vertical axis and at a speed relatively different from the speed of rotation of the core.

11. A tire-building machine including a rotatable turret-component, actuating mechanism therefor comprising operating shafting, connecting gearing, a clutch device, and slippage mechanism, for controlling the movement of the turret-component; a core-component, actuating mechanism therefor comprising low and high-speed gearing and a clutch-device therefor; a stitcher-carriage and actuating mechanism therefor; and driving mechanism common to said three actuating mechanisms for operating the same simultaneously or in succession, and including a motor juxtaposed to one of said components.

In testimony whereof I affix my signature in presence of two witnesses.

JOHN J. CONVERY.

Witnesses:
EDMUND H. PARRY,
JAMES ATKINS.